United States Patent [19]

Klootwyk

[11] 4,189,528
[45] Feb. 19, 1980

[54] POWER MODULE ASSEMBLY

[75] Inventor: Ronald I. Klootwyk, San Jose, Calif.

[73] Assignee: The Continental Group, Inc., New York, N.Y.

[21] Appl. No.: 955,565

[22] Filed: Oct. 30, 1978

[51] Int. Cl.² .............................................. H01M 6/00
[52] U.S. Cl. ....................................... 429/70; 429/72; 429/152
[58] Field of Search ................... 429/72, 70, 68, 67, 429/66, 122, 152, 34, 35

[56] References Cited

U.S. PATENT DOCUMENTS

| | | | |
|---|---|---|---|
| 3,551,208 | 12/1970 | Stachurski | 429/68 X |
| 3,920,476 | 11/1975 | Black et al. | 429/68 |
| 4,109,064 | 8/1978 | Warner et al. | 429/66 |

Primary Examiner—Anthony Skapars
Attorney, Agent, or Firm—Charles E. Brown

[57] ABSTRACT

A power module assembly in the form of an electrochemical battery which is composed of a plurality of anode-cathode units arranged in stacked relation within a housing. It is necessary that the anodes and cathodes be tightly pressed together at all times so that as an electrolyte flows therebetween there will be the desired electrochemical reaction. This is accomplished by a pressure device. Since the anodes are consumable, as the anodes are consumed it is necessary that the stack be compressed to that the same pressure may be maintained between the anodes and cathodes. Accordingly, the pressure device is capable of expanding and at the same time transmitting constant pressure on the stack.

12 Claims, 3 Drawing Figures

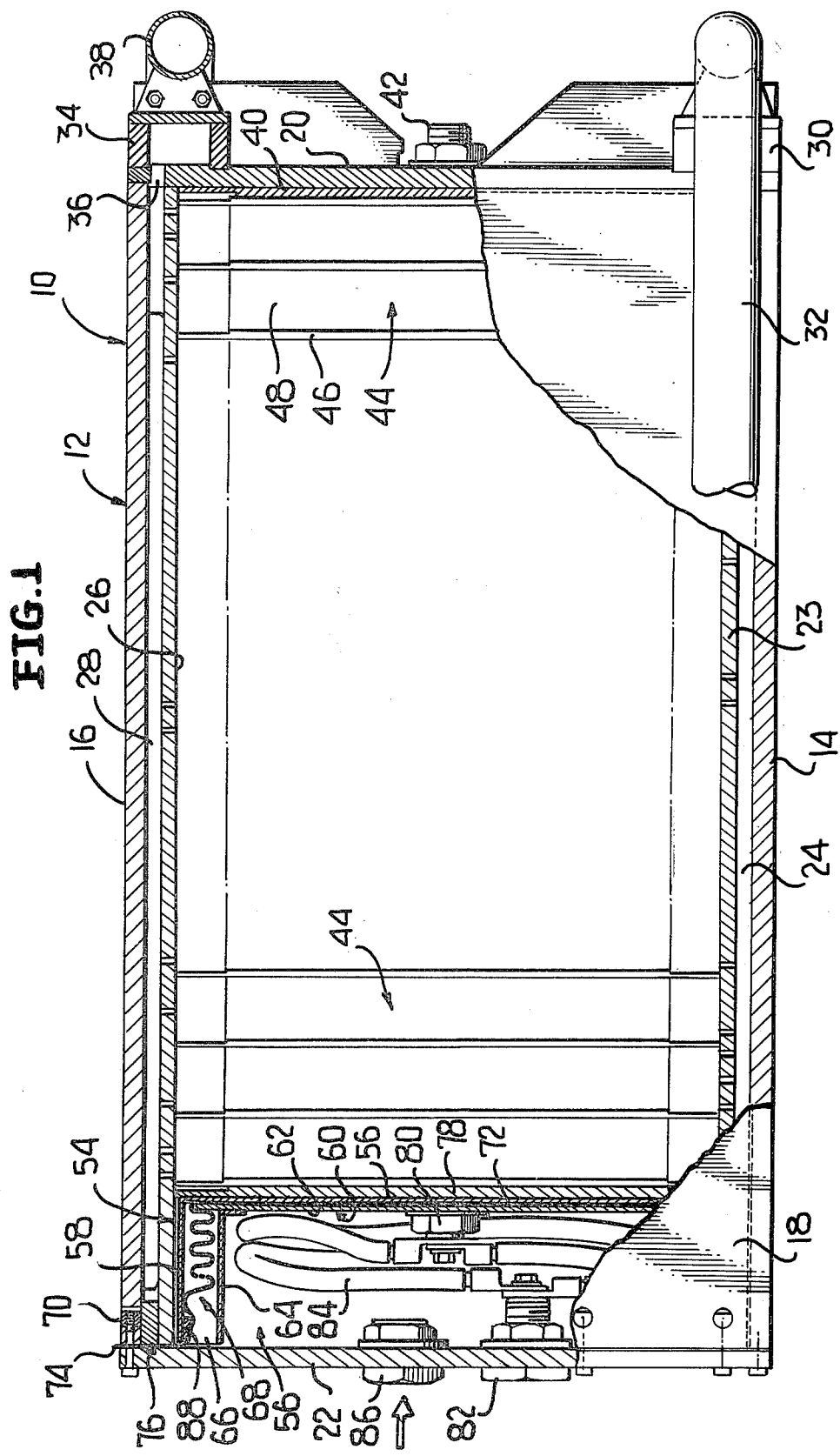

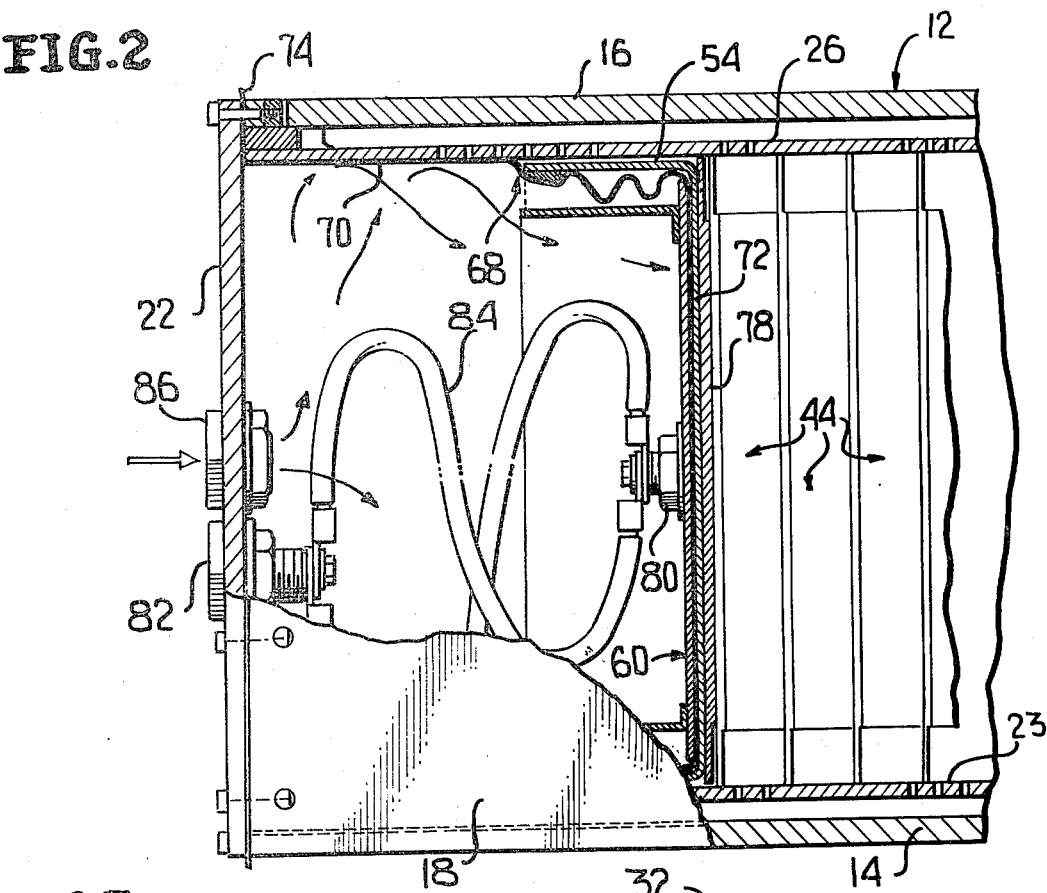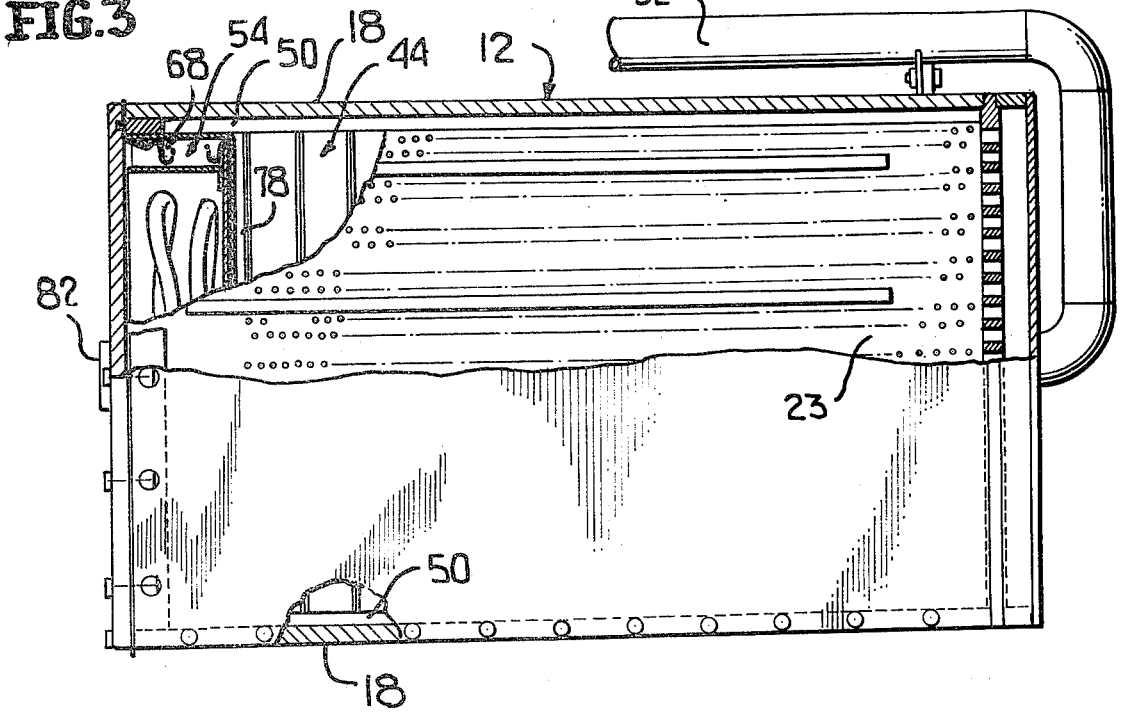

POWER MODULE ASSEMBLY

This invention relates to certain improvements in power modules of the electrochemical battery type, and most particularly relates to a power module of the type wherein anodes and cathodes are arranged in stacked relation and a pressure is exerted on the stack to maintain a uniform pressure contact between the anodes and cathodes in all operating stages of the power module.

This invention particularly relates to a power module wherein one of the anode-cathode elements thereof is consumed in the operation of the power module. It is normally the anode which is consumed. Accordingly, it is not only necessary to provide an initial pressure on the anode-cathode stack, but also to maintain that pressure as the anodes are consumed and the thickness of the stack gradually decreases.

In the past, pressure devices such as spring bellows and the like have been utilized. However, as the thickness of the stack decreases the pressure exerted on the stack has varied because of the resistance of the bellows to defomation. Further, such bellows must be formed of non-corrosive metals which are extremely expensive.

Usual fluid pressure devices are not functional in the environment because of the question of electrolyte leakage.

In accordance with this invention, it is proposed to provide a pressure device in the form of an extendable bag which forms a seal with the interior of the housing in which the anode-cathode stack is positioned so as to occupy the space previously occupied by the stack as the thickness of the stack decreases, while at the same time being operable to apply constant pressure on the stack. A principal feature of the invention is the manner in which the pressure bag is mounted within an internal housing carried by a pressure member to which the bag is secured whereby as the pressure member moves the bag is payed out of the internal housing and there is no resistance to the extension of the pressure bag, whereby the pressure exerted by the pressure member on the stack remains constant.

With the above and other objects in view that will hereinafter appear, the nature of the invention will be more clearly understood by reference to the following detailed description, the appended claims, nd the several views illustrated in the accompanying drawings.

IN THE DRAWINGS

FIG. 1 is a side elevational view of the power module with parts broken away and shown in section.

FIG. 2 is a fragmentary side elevational view similar to FIG. 1, but with the anode-cathode stack of a reduced thickness due to the anodes having been partially consumed.

FIG. 3 is a bottom view of the power module with parts broken away and shown in section.

Referring now to the drawings in detail, it will be seen that the power module is generally identified by the numeral 10 and includes an elongated case or housing 12 having a bottom wall 14, a top wall 16, and side walls 18. One end of the case 12 is closed by an end wall 20 while an end wall 22 closes the opposite end of the case. Generally speaking, the end wall 20 will be fixed and the end wall 22 removable.

A perforated plate 23 is mounted within the case 12 in spaced relation above the bottom wall 14 to define an inlet manifold 24. A similar perforated plate 26 is mounted within the case 12 in spaced relation below the top wall 16 to define an outlet manifold 28.

A supply manifold 30 is mounted on the exterior of the end plate 20 and is in communication with the inlet manifold 24. A suitable supply pipe 32 is connected to the supply manifold 30.

In a like manner, a discharge manifold 34 is carried by the end plate 20 and is placed in communication with the outlet manifold 28 by means of outlet passages 36. A discharge pipe 38 is suitably connected to the discharge manifold 34.

Positioned inside of the end wall 20 is a contact plate 40 to which there is electrically connected an electrode 42 which extends through the end wall 20 and also serves to clamp the contact plate 40 against the end wall 20.

A plurality of anode-cathode units 44 are stacked within the case 12 and extend generally vertically between the plates 23, 26. Each anode-cathode unit 44 includes a cathode plate 46 and a consumable anode 48. It is to be understood that the anode plate 48 may simultaneously serve as a support for an associated anode and also on the opposite face thereof function as the cathode. The cathode plate 46 remote from its anode 48 may have a screen facing to provide for an intimate contact with the next adjacent anode.

It is to be understood that a suitable electrolyte is to flow between adjacent anodes and cathodes.

With reference to FIG. 3, it is to be noted that the case 12 may have disclosed therein in generally face-to-face relation with the side walls 18 a pair of liner plates 50. The cathode plate 46 is supported by the perforated plates 23, 26 while the liner plates 50 form a seal against the stack of anode-cathode units to eliminate electrolyte bypass flow from inlet to outlet of the module.

In order to obtain the most beneficial electro-chemical reaction between each anode and its adjacent cathode, it is necessary that the anode and cathode be tightly pressed together at a predetermined pressure. Accordingly, it is necessary that the stack of anode-cathode units be pressurized at a uniform pressure and forced toward the contact plate 40. It is also necessary that this pressure be maintained as the thickness of the stack decreases due to the anodes 48 being consumed. For this purpose there is provided a pressure assembly, generally identified by the numeral 52, which is mounted within the case 12 adjacent the end plate 22. The pressure assembly includes a slipper box 54 which is defined by a plate 56 in the form of a pressure member and a peripheral flange 58. A support box 60 is telescoped within the slipper box 54. The support box 60 includes a plate 62 having secured thereto a peripheral flange 64. The flange 58 forms an outer wall and the flange 64 forms an inner wall of a sleeve-like space 66 which retains the bag in the desired configuration.

The pressure device includes an extendable member in the form of an elongated bag, generally identified by the numeral 68. The bag 68 includes a body 70 of a cross section corresponding substantially to the internal cross section of the case 12 between the plates 23, 26 and 50. The pressure bag 68 also includes an end wall 72 which is clamped between the pressure member 56 and the plate 62. Initially the body 70 is gathered within the space 66 such as by folding or pleating.

The bag 68 also includes a mounting flange 74 which is clamped between the end plate 22 and the adjacent end portion of the case 12 so as to restrain the upper end of the bag 68 against movement. The bag is sealed relative to the end wall 22 by a suitable sealing member 76.

Preferably a contact plate 76 is disposed between the pressure member 56 and the adjacent anode-cathode unit 44. The contact plate 78 is provided with an electrode 80 which extends through the slipper box 24 and the support box 60 as well as through the bottom 72 of the bag. The electrode 80 is coupled to a fixed electrode 82 carried by the end wall 22 by means of elongated cables 84. This permits the contact plate 78 to move longitudinally within the case 12 as the thickness of the stack decreases while remaining in electrically conducting contact with the electrode 82.

A suitable fitting 86 is carried by the end wall 22 for the purpose of internally pressurizing the bag 68. While the fluid may be of any type, it is preferably in the form of an inert gas.

It is also pointed out at this time that the inner surface of the flange 58 adjacent the free end thereof is provided with a slide member 88 which controls the paying out of the gathered body 70 of the bag 68.

OPERATION

When it is desired to activate the power module assembly 10, the bag 68 is internally pressurized, thus forcing the contact plate 78 at the left end of the stack to the right and utilizing the same to compress the stack between it and the contact plate 40 under a predetermined load. Electrolyte is then permitted to flow between adjacent anodes and cathodes with the result that the power module through an electrochemical reaction will function to generate electrical energy. As the electrical energy is generated, the anodes 48 are consumed with the result that the thickness of the stack decreases. As the thickness of the stack decreases, the assembly of the contact plate 78, the slipper box 54, the support box 60 and the bag bottom 72 move to the right to maintain a constant pressure or load of the stack. Inasmuch as the free or left end of the bag 68 is anchored, as the bag bottom 72 moves to the left the bag body 70 is gradually payed out of the space 66 without any resistance. The bag body adjacent its anchored end is forced into pressure contact with the plates 23, 26 and 50 but in no way resists the movement of the bag bottom 72 to the right. Thus, a constant pressure may be exerted on the stack of anode-cathode units 44 even though the total thickness of the stack is reduced as much as 90%.

It is also to be noted that as the bag 68 is expanded and the body 70 thereof moves into engagement with the plates 23, 26 and 50, it functions as a sealing liner, particularly with respect to the perforated plates 23, 26 so as to eliminate the flow of electrolyte through the space previously occupied by the stack. Thus the resistance to electrolyte flow between the inlet manifold 24 and the outlet manifold 28 remains constant in that there remains available for electrolyte flow only that space through the inner faces between adjacent anodes and cathodes.

It is to be understood that the bag 68 is to be formed of a material which will readily straighten out from its gathered or pleated condition with substantially no force being required so that the pessure exerted by the contact plate 78 may remain constant. As the same time, since the bag 68 will come into contact with the electrolyte, it is necessary that the bag be formed of a suitable material which will not be chemically affected by the electrolyte and the anode byproducts carried thereby. Preferably, the bag should be formed of a suitable plastics material.

Although only a preferred embodiment of the power module assembly and the pressure device thereof have been specifically illustrated and described herein, it is to be understood that minor variations may be made therein without departing from the spirit and scope of the invention as defined by the appended claims.

What is claimed as new is:

1. In an assembly of the type including an elongated housing, a plurality of expendable members arranged in stacked relation longitudinally within said housing; a pressure applying device for maintaining said stacked members in constant pressure contact with each other, said pressure applying device comprising a pressure member for applying a constant pressure to the stack, an expandable member secured to said pressure member at one end and to said housing at the opposite end thereof and in combination therewith defining a sealed expansible chamber, said pressure member having a peripheral housing extending therefrom remote from said expendable members, said expandable member having an intermediate portion gathered within said peripheral housing, and means for introducing a fluid under pressure into said chamber.

2. The assembly of claim 1 wherein said peripheral housing has inner and outer walls defining a peripheral sleeve-like space opening remote from said expendable members, and said expandable member intermediate portion being within said sleeve-like space.

3. The assembly of claim 1 wherein said expandable member is generally in the form of a tube and said opposite end thereof is secured between an end portion of said elongated housing and an end plate of said elongated housing.

4. The assembly of claim 3 wherein said expandable member is in the form of a bag having an end wall, and said end wall is secured to said pressure member.

5. The assembly of claim 1 wherein said expandable member is in the form of a bag having an end wall, and said end wall is secured to said pressure member.

6. The assembly of claim 1 wherein said expandable member is in the form of a bag having an end wall, and said end wall is secured to said pressure member by a clamp plate, said peripheral housing has an outer wall carried by said pressure member and an inner wall carried by said clamp plate, said inner and outer walls defining a peripheral sleeve-like space opening remote from said expendable members, and said expandable member intermediate portion being within said sleeve-like space.

7. The assembly of claim 6 wherein said outer wall carries a slide member for facilitating the movement of said expandable member out of said sleeve-like space in response to movement of said pressure member away from said expandable member other end.

8. The assembly of claim 6 wherein said expandable member opposite end is secured between an end portion of said elongated housing and an end plate of said elongated housing.

9. The assembly of claim 1 wherein said assembly is a power module and said expendable member is an anode.

10. The assembly of claim 9 wherein there is a cable within said chamber, said cable extending between said pressure member and a fixed electrode carried by said elongated housing.

11. The assembly of claim 1 wherein said assembly is an electrochemical battery and includes contacting anodes and cathodes, said elongated housing having means for flowing electrolyte between adjacent anodes and cathodes, and said expandable member forming an inner sealing liner for said housing as the effective thickness of said stacked members decreases.

12. The assembly of claim 11 wherein said expandable member is generally in the form of a tube and said opposite end thereof is secured between an end portion of said elongated housing and an end plate of said elongated housing.

* * * * *